United States Patent [19]
Omote

[11] Patent Number: 5,671,166
[45] Date of Patent: Sep. 23, 1997

[54] BARREL SHIFTER FOR COMBINING PIECES OF DATA INTO A PIECE OF COMBINED DATA AND SHIFTING THE COMBINED DATA

[75] Inventor: Kazuyuki Omote, Yokohama, Japan

[73] Assignee: Kabushiki Kaisha Toshiba, Kawasaki, Japan

[21] Appl. No.: 340,486

[22] Filed: Nov. 14, 1994

Related U.S. Application Data

[63] Continuation of Ser. No. 991,300, Dec. 15, 1992, abandoned.

[30] Foreign Application Priority Data

Dec. 16, 1991 [JP] Japan ................................. 3-332143

[51] Int. Cl.[6] .................................................. G06F 7/00
[52] U.S. Cl. ........................................................ 364/715.08
[58] Field of Search ..................... 364/715.01, 715.07, 364/715.08, 715.04

[56] References Cited

U.S. PATENT DOCUMENTS

| 4,931,925 | 6/1990 | Utsumi et al. ........... 364/715.08 X |
| 5,130,940 | 7/1992 | Omote ...................... 364/715.08 |

FOREIGN PATENT DOCUMENTS 2119976  11/1983  United Kingdom ............. 364/715.08

*Primary Examiner*—Chuong D. Ngo
*Attorney, Agent, or Firm*—Foley & Lardner

[57] ABSTRACT

A barrel shifter is provided with a plurality of shifters arranged in series for combining pieces of data A, B respectively represented by a sequence of 32-bit, 16-bit, or 8-bit binary digits into a piece of combined data C and shifting the combined data C by some bits. The shifters consists of a 16-bit shifter, 8-bit shifter, 4-bit shifter, 2-bit shifter, and two 1-bit shifters. The 32-bit data A, B are shifted in the 16-bit shifter. The 16-bit data B is shifted in the 16-bit shifter to connect with the 16-bit data A. The 8-bit data B is shifted in the 16-bit shifter to approach the 8-bit data B. The combined data C formed by connecting the 32-bit data A, B or the 16-bit data A, B in the 16-bit shifter is shifted in the following shifters. The 8-bit data B in the 16-bit shifter is shifted in the 8-bit shifter to connect with the 8-bit data A so that the combined data C is formed. The combined data C formed by connecting the 8-bit data A, B in the 8-bit shifter is shifted in the following shifters.

8 Claims, 11 Drawing Sheets

OUTPUT DATA D

32 - BIT DATA A & B
SL1 = "ON" , SR1 = "ON"

32 - BIT DATA A & B
SL1 = "OFF" , SR1 = "OFF"

16 OR 8 - BIT DATA A & B
SL1 = "OFF" , SR1 = "ON"

16 - BIT DATA A & B
SL11 = "ON" , SR11 = "ON"

16 - BIT DATA A & B
SL11 = "OFF" , SR11 = "OFF"

8 - BIT DATA A & B
SL11 = "OFF" , SR11 = "ON"

BARREL SHIFTER FOR COMBINING PIECES OF DATA INTO A PIECE OF COMBINED DATA AND SHIFTING THE COMBINED DATA

This application is a continuation of application Ser. No. 07/991,300, filed Dec. 15, 1992, now abandoned.

BACKGROUND OF THE INVENTION

1. Field of the Invention

The present invention relates generally to a barrel shifter for shifting a piece of data represented by a sequence of binary digits at a time by a plurality of bits to a higher position (left) or a lower position (right), and more particularly to a barrel shifter for connecting pieces of data in series to form a piece of combined data and shifting the combined data to left of right by some bits.

2. Description of Background

Shift operations such as an arithmetic shift, a rotating shift and a double shift have been recently performed by utilizing a barrel shifter. For example, as shown in FIG. 1, a piece of data DA1 represented by an n-bit sequence of binary digits (or a piece of n-bit data DA1) and a piece of data DA2 represented by an n-bit sequence of zero digits are combined to produced a piece of combined data DA3 consisting of a 2n-bit sequence of binary digits. In this case, the data DA2 follows the least significant digit of the data DA1 to produce the combined data DA3. Also, an M-bit sequence of binary digits Dm of higher position in the data A consist of zero digits. Thereafter, the combined data DA3 is shifted to a higher position (left) by some bits M before an n-bit sequence of binary digits of higher positions in the combined data DA3 are selected as a piece of n-bit output data DA4. As a result of the selection of the output data DA4, the data DA1 is multiplied by $2^M$ to obtain the data DA4. This operation is called a type of the arithmetic shift.

Also, as shown in FIG. 2, a piece of n-bit data DA5 and a piece of n-bit data DA6 are combined to produce a piece of 2n-bit combined data DA7. Thereafter, the combined data DA7 is shifted to left by some bits M before an n-bit sequence of binary digits of higher positions in the combined data DA7 are selected as a piece of n-bit output data DA8. This operation is called a type of the double shift.

Also, as shown in FIG. 3, two pieces of n-bit data DA9 are combined in series to produce a piece of 2n-bit data DA10. Thereafter, the combined data DA10 is shifted to left by some bits M before an n-bit sequence of binary digits of higher positions in the combined data DA10 are selected as a piece of n-bit output data DA11. As a result of the selection of the output data DA11, as shown in FIG. 4, a sequence of binary digits representing the data DA9 are rotated by some bits M to produce the output data DA11. This operation is called a type of the rotating shift.

FIG. 5 is a block diagram of a conventional barrel shifter in which two pieces of data are connected in series to form a combined data and are shifted by some bits to perform a shift operation such as the arithmetic shift, the rotating shift or the double shift.

As shown in FIG. 5, a conventional barrel shifter 11 consists of a first data selector 12 for selecting a piece of data A represented by an n-bit sequence of binary digits from pieces of data provided from data sources (not shown), a second data selector 13 for selecting either the data A or a piece of data B represented by an n-bit sequence of binary digits provided from the data sources, a data arranging section 14 for arranging the data A or B selected by the second data selector 13 at a prescribed position to form a piece of combined data C, and a cell array 15 for shifting the combined data C.

The data arranging section 14 is provided with a 16-bit shifter 16 for shifting the data A or B selected by the second data selector 13 to left by 16 bits to arrange the data A or B at the prescribed position in accordance with a 16-bit shift control signal, an 8-bit shifter 17 for shifting the data A or B selected by the second data selector 13 by 8 bits to arrange the data A or B at the prescribed position in accordance with an 8-bit shift control signal, and a combined data register 24 for holding the data A selected by the first data selector 12 and the data A or B shifted by the 8-bit shifter 17 in series to form the combined data C. The shifters 16, 17 and the combined data register 24 are arranged in series. The combined data C is formed by serially receiving both the data A selected by the first data selector 12 and the data A or B arranged in the 8-bit shifter.

The cell array 15 is provided with a 16-bit shifter 18, an 8-bit shifter 19, a 4-bit shifter 20, a 2-bit shifter 21, and two 1-bit shifters 22, 23 which are arranged in series in that order. The combined data C is independently shifted by each of the shifters 18 to 23 in accordance with each of shift control signals provided to the shifters 18 to 23. Therefore, the combined data C is shifted by some bits ranging from 0 bit to 32 bits as a result of combinations of 16 bits shift, 8 bits shift, 4 bits shift, 2 bits shift, 1 bit shift, and 1 bit shift.

FIG. 6 shows arrangements of both the data A selected by the first data selector 12 and the data A or B arranged in the data arranging section 14.

As shown in FIG. 6, the first data selector 12, the second data selector 13 and the data arranging section 14 are respectively provided with thirty-two columns. Each of the binary digits of the pieces of data A, B is held in a column. Also, the least significant digit of the data A selected by the first data selector 12 is temporarily held in the thirty-second column (or the right end column) of the first data selector 12. In the same manner, the least significant digit of the data A or B selected by the second data selector 13 is temporarily held in the thirty-second column of the second data selector 13. In addition, the most significant digit of the data A or B arranged in the data arranging section 14 is temporarily held in the first column (or the left end column) of the data arranging section 14.

Therefore, in cases where the pieces of data A, B respectively have 32-bit sequence of binary digits (32-bit length), as shown in FIG. 7A, all of the columns of the data selectors 12, 13 and the data arranging section 14 are occupied by the binary digits of the data A and/or B. In this case, no shift operation is performed in the data arranging section 14.

On the other hand, in cases where the pieces of data A, B respectively have 16-bit sequence of binary digits (16-bit length), as shown in FIG. 7B, the columns of the data selectors 12, 13 ranging from the seventeenth column to the thirty-second column are occupied with the binary digits of the data A, B. Also, the columns of the data arranging section 14 ranging from the first column to the sixteenth column are occupied with the binary digits of the data A or B. In this case, the data A or B is shifted to left by 16 bits in the 16-bit shifter 16 of the data arranging section 14.

Also, in cases where the pieces of data A, B respectively have 8-bit sequence of binary digits (8-bit length), as shown in FIG. 7C, the columns of the data selectors 12, 13 ranging from the twenty-fifth column to the thirty-second column are occupied with the binary digits of the data A, B. Also, the columns of the data arranging section 14 ranging from the first column to the eighth column are occupied with the binary digits of the data A or B. In this case, the data A or B held in the second data selector 13 is shifted to left by 24 bits in the data arranging section 14. In detail, the data A or B is shifted in both the 16-bit shifter 16 and the 8-bit shifter 17 of the data arranging section 14 in sequence.

Therefore, the data A or B selected by the second data selector 13 is shifted to arrange the data A or B at upper columns of the 8-bit shifter 17 in accordance with the number of binary digits (or the bit length) of the data A or B. Thereafter, the combined data C is formed in the combined data register 24 by serially receiving the data A selected by the first data selector 12 and the data A or B shifted by the 8-bit shifter 17.

As a result, regardless of the bit length of the pieces of data A, B, the combined data C is shifted in the cell array 15.

FIG. 8 explanatorily shows a shift operation performed in the cell array 15. The combined data C is shifted by some bits to left.

As shown in FIG. 8, in cases where a piece of 32-bit combined data C formed by connecting two pieces of 16-bit data A in series is shifted to left by 6 bits in the cell array 15 to execute the rotating shift, the combined data C is shifted in the 4-bit shifter 20 and the 2-bit shifter 21 of the cell array 15 in sequence. Thereafter, a sequence of binary digits held in columns of the 1-bit shifter 23 ranging from the seventeenth column to the thirty-second column are shifted out as a piece of 16-bit output data D.

Therefore, six upper binary digits of the data A selected by the first data selector 12 are abandoned, and ten lower binary digits of the data A are carried by six places to make ten upper binary digits of the output data D. In addition, six upper binary digits of the data A selected by the second data selector 13 are utilized as six lower binary digits of the output data D. In short, the data A is rotated by six bits to form the output data D.

In the same manner, in cases where a piece of 8-bit data is selected by the data selectors 12, 13, a piece of 16-bit combined data formed by connecting two pieces of 8-bit data selected by the data selectors 12, 13 in series is shifted to left by some bits in the cell array 15 to execute the rotating shift, and a sequence of binary digits of a piece of 8-bit output data is shifted out from columns of the 1-bit shifter 23 ranging from the twenty-fifth column to the thirty-second column.

Also, in cases where a piece of 32-bit data is selected by the data selectors 12, 13, a piece of 64-bit combined data formed by connecting two pieces of 32-bit data selected by the data selectors 12, 13 in series is shifted to left by some bits in the cell array 15 to execute the rotating shift, and a sequence of binary digits of a piece of 32-bit output data are shifted out from columns of the 1-bit shifter 23 ranging from the first column to the thirty-second column.

In addition, in cases where a piece of data A is selected by the first data selector 12 and a piece of data B is selected by the second data selector 13, a piece of combined data formed by connecting the pieces of data A, B in series is shifted to left or right by some bits in the cell array 15 to execute the double shift, and a piece of output data is shifted out.

Furthermore, in cases where a piece of data A is selected by the first data selector 12 and a piece of data B represented by a sequence of zero digits is selected by the second data selector 13, a piece of combined data formed by connecting the pieces of data A, B in series is shifted to left by some bits in the cell array 15 to execute the arithmetic shift, and a piece of output data is shifted out.

Therefore, the shift operations such as the arithmetic shift, the rotating shift and the double shift can be performed in the barrel shifter 11 by arranging a piece of data selected by the second data selector 13 in the data arranging section 14 and shifting a piece of combined data by some bits.

However, the data arranging section 14 is necessarily required to perform the shift operations. In addition, because it is required to install the 16-bit shifter 16, the 8-bit shifter 17 and the combined data register 24 in the data arranging section 14, an area occupied by the data arranging section 14 is necessarily required. Therefore, a total area occupied by the conventional barrel shifter 11 is increased so that the integration of the barrel shifter 11 becomes difficult.

Also, the data A or B selected by the second data selector 13 is temporarily held in the data arranging section 14 so that operating time required to perform the shift operation is increased. Therefore, it is difficult to perform the shift operation at a high speed.

In addition, because the data A or B selected by the second data selector 13 is shifted in the data arranging section 14 depending on the number of binary digits of the data A or B, shift control signals must be provided to the data arranging section 14 to control the number of bits shifted in the data arranging section 14. In this case, a detecting signal is first provided from a control section (not shown) to the data arranging section 14 to detect the number of binary digits of the data A or B held in the data arranging section 14. Thereafter, the shift control signals are provided from the control section to the data arranging section 14.

Accordingly, a control system for arranging the data A or B in the data arranging section 14 becomes complicated so that the conventional barrel shifter 11 cannot be manufactured at a moderate price.

SUMMARY OF THE INVENTION

A first object of the present invention is to provide, with due consideration to the drawbacks of such conventional barrel shifter, a small-sized barrel shifter in which shift operations such as an arithmetic shift, a rotating shift and a double shift are performed.

A second object of the present invention is to provide a barrel shifter in which the shift operations are performed at a high speed.

A third object of the present invention is to provide a barrel shifter in which the shift operations are performed by utilizing a simplified control system.

The first, second and third objects are achieved by the provision of a barrel shifter comprising:

first data input means having N1 columns (N1 is an integer) for receiving a piece of data A represented by a sequence of N2 (N2 is an integer and N2≦N1) binary digits in the columns, each of the binary digits being held in a column and a least significant bit of the data A being held in a last column of the N1 columns;

second data input means having N1 columns for receiving a piece of data B represented by a sequence of N2 binary digits in the columns, each of the binary digits being held in a column and a least significant bit of the data B being held in a last column of the N1 columns; and cell array means having both a top shifter and a bottom shifter arranged in series for connecting the pieces of data A, B in series to combine the pieces of data A, B into a piece of combined data C and shifting the combined data C by a plurality of bits, wherein the top shifter has N3 columns (N3 is an integer and N1<N3<2N1) in which lower binary bits of the data A held in the first data input means and upper binary bits of the data B held in the second data input means are transferred in case of N2=N1 and the binary digits of the data A and the binary digits of the data B are transferred in case of N2<N1 to form the combined data C of which the least significant bit is held in a last column of the N3 columns, and the bottom shifter has N4 columns (N4 is an integer and N1<N4<N3) in which a sequence of N4 binary digits among the N3 binary digits held in the columns of the top shifter are transferred in case of N2=N1 and either a portion of binary digits held in the columns of the top shifter or all the binary digits held in the columns of the top shifter are transferred in case of N2<N1, a sequence of N2 binary digits held in the bottom shifter being shifted out as an output data.

In the above configuration of the barrel shifter, the N2-bit data A is held in the first data input means, and the N2-bit data B is held in the second data input means. In this case, the least significant bit of the data A is held in the last column of the first data input means, and the least significant bit of the data B is held in the last column of the second data input means. Therefore, in cases where the number of columns N1 of the first and second data input means equals to the number of binary digits N2 representing the pieces of data A, B, all of the columns of the first and second data input means are occupied by the binary digits of the pieces of the data A, B. This means that the combined data C is substantially formed in the first and second data input means. On the other hand, in cases where the number of columns N1 of the first and second data input means is higher than the number of binary digits N2 representing the pieces of data A, B, upper columns of the first and second data input means are not occupied by the binary digits of the pieces of the data A, B.

Thereafter, in cases where N1 equals to N2, the pieces of data A, B are shifted by some bits in both the top shifter and the bottom shifter before the output data is shifted out from the bottom shifter.

Also, in cases where N1 is higher than N2, the most significant bit of the data B is arranged to follow the least significant bit of the data A in the top one of the shifter so that the pieces of data A, B are combined to form the combined data C in the top shifter. Thereafter, the combined data C is shifted by some bits in the bottom shifter before the output data is shifted out from the bottom shifter.

Accordingly, because the top shifter is utilize to shift the combined data C in case of N1=N2 and to form the combined data C in cases of N1>N2, an additional shifter for privately forming the combined data C is not required in the barrel shifter according to the present invention.

Also, because the additional shifter is not installed in the barrel shifter according to the present invention, an operating time for performing a shift operation is shortened, and the shift operation can be performed at a high speed.

It is preferred that the top shifter in the above barrel shifter comprises:

a 16-bit shifter for shifting the pieces of 32-bit data A, B held in the first and second data input means respectively having thirty-two columns (N1=32) by 16 bits in accordance with first and second control signals in case of N2=32, shifting the 16-bit data B held in the second data input means having thirty-two columns (N1=32) by 16 bits in accordance with the second control signal to form the combined data C in case of N2=16, and shifting the 8-bit data B held in the second data input means having thirty-two columns (N1=32) by 16 bits in accordance with the second control signal in case of N2=8; and a 8-bit shifter for shifting a sequence of binary digits shifted by the columns of the 16-bit shifter by 8 bits in accordance with third and fourth control signals in case of N2=32 or 16 and shifting the 8-bit data B shifted by the 16-bit shifter by 8 bits to form the combined data C in accordance with the fourth control signal in case of N2=8. In the above configuration of the top one of the shifter, in cases where the bit length of the pieces of data A, B is either 32, 16 or 8, the pieces of data A, B are selected by the first and second data input means having the thirty-two columns. Therefore, when the 16-bit data B held in the second data input selector is shifted in the 16-bit shifter by 16 bits, the combined data C is formed in the 16-bit shifter. Also, when the 8-bit data B held in the second data input selector is shifted in both the 16-bit shifter and the 8-bit shifter, the combined data C is formed in the 8-bit shifter.

Therefore, the combined data C can be necessarily formed in the top one of the shifters.

A shift operation performed to shift the pieces of data A, B held in the first and second data input means is limited to three type of patterns. That is, it is preferred that the 32-bit data A held in the first data input means be shifted by the 16-bit shifter on condition that the 32-bit data B held in the second data input means is shifted by the 16-bit shifter, and the 16-bit data A held in the first data input means be not shifted by the 16-bit shifter.

The above shift operation is performed by providing the first and second control signals to the 16-bit shifter. In detail, allowed combinations of the first and second control signals are "on" and "on", and "off" and "off" for the pieces of 32-bit data A, B. Also, an allowed combination of the first and second control signals is "off" and "on" for the pieces of 16-bit data A, B or the pieces of 8-bit data A, B.

Accordingly, a control system for generating the first and second control signals can be simplified.

Also, a shift operation performed to shift the pieces of 8-bit data A, B held in the 16-bit shifter is limited to a type of pattern. That is, it is preferred that the 8-bit data B held in the 16-bit shifter be shifted by the 8-bit shifter, while the 8-bit data A held in the 16-bit shifter be not shifted by the 8-bit shifter.

The above shift operation is performed by providing the third and fourth control signals to the 8-bit shifter. In detail, an allowed combination of the third and fourth control signals is "off" and "on".

Accordingly, a control system for generating the third and fourth control signals can be simplified.

It is preferred that the bottom shifter in the above barrel shifter comprises:

a 4-bit shifter for shifting the combined data C shifted by the 8-bit shifter by 4 bits in accordance with a fifth control signal;

a 2-bit shifter for shifting the combined data C shifted by the 4-bit shifter by 2 bits in accordance with a sixth control signal;

a first 1-bit shifter for shifting the combined data C shifted by the 2-bit shifter by a bit in accordance with a seventh control signal; and a second 1-bit shifter for shifting the combined data C shifted by the first 1-bit shifter by a bit in accordance with an eighth control signal.

In this case, the combined data C formed in the top the shifter is shifted in the 4-bit shifter, the 2-bit shifter, and the 1-bit shifters. Therefore, the combined data C formed by pieces of 32-bit data A, B can be shifted by some bits ranging from 0 bit to 31 bits. Also, the combined data C formed by pieces of 16-bit data A, B can be shifted by some bits ranging from 0 bit to 15 bits. In addition, the combined data C formed by pieces of 8-bit data A, B can be shifted by some bits ranging from 0 bit to 7 bits.

BRIEF DESCRIPTION OF THE DRAWINGS

The objects, features and advantages of the present invention will be apparent from the following description taken in conjunction with the accompanying drawings, in which.

DETAIL DESCRIPTION OF THE PREFERRED EMBODIMENTS

Preferred embodiments of a barrel shifter according to the present invention are described with reference to drawings.

A first embodiment of a barrel shifter, in which pieces of 32-bit data, pieces of 16-bit data or pieces of 8-bit data are shifted in accordance with a shift operation such as an arithmetic shift, a rotating shift or a double shift, is described with reference to FIGS. 9 to 11.

Figure 9:
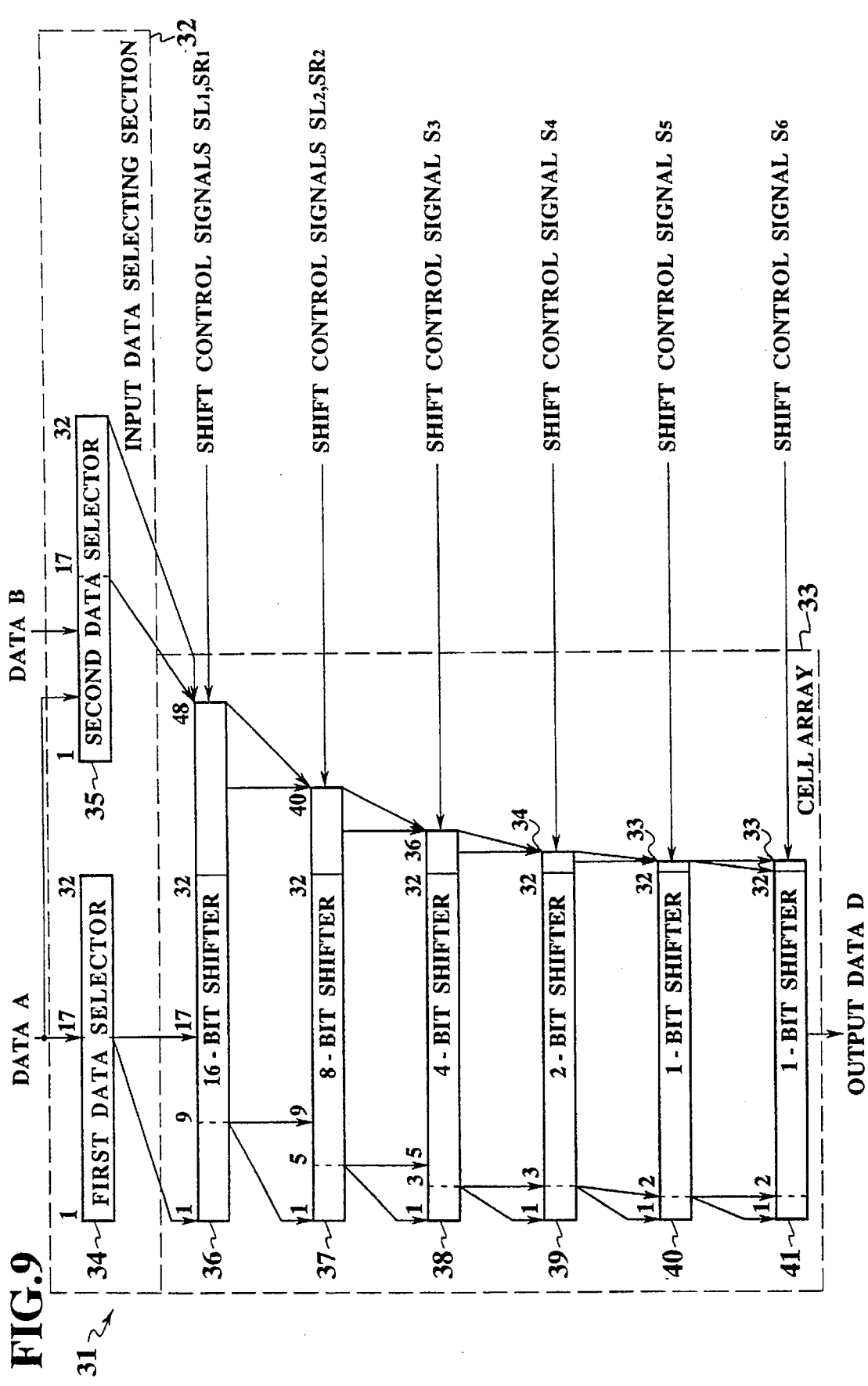
FIG. 9 is a block diagram of a barrel shifter in which pieces of data are shifted to perform a shift operation such as an arithmetic shift, a rotating shift or a double shift.

FIG. 9 is a block diagram of a barrel shifter in which pieces of data are shifted to perform a shift operation such as an arithmetic shift, a rotating shift or a double shift.

As shown in FIG. 9, a barrel shifter 31 according to the first embodiment comprises an input data selecting section 32 for selecting pieces of input data A, B from among large pieces of data provided from data sources (not shown) and temporarily holding the data selected thereby, and a cell array 33 for connecting the data selected by the input data selecting section 32 in series to form a piece of combined data C and shifting the combined data C to shift out a piece of output data D. Each of the data A, B, C, and D is represented by a sequence of binary digits.

The input data selecting section 32 comprises a first data selector 34 for selecting a piece of n-bit data A from among pieces of data provided from the data sources, a second data selector 35 for selecting either the data A or a piece of n-bit data B provided from the data sources.

Each of the data selectors 34, 35 has thirty-two columns. Therefore, the least significant bits of the pieces of data A, B are respectively held at the thirty-second column of the data selector 34 or 35. In this case, the data B is selected by the second data selector 35 to simplify the description of the first embodiment.

The cell array 33 comprises a 16-bit shifter 36 having forty-eight columns for shifting the data A held in the first data selector 34 and the data B held in the second data selector 35 in accordance with shift control signals $SL_1$, $SR_1$ and holding the pieces of data A, B shifted thereby.

Transference of the binary digits held in the data selectors 34, 35 to upper and middle columns of the 16-bit shifter 36 ranging from the first column to the thirty-second column is determined in accordance with the shift control signal $SL_1$, while transference of the binary digits held in the data selectors 34, 35 to lower columns of the 16-bit shifter 36 ranging from the thirty-third column to the forty-eighth column is determined in accordance with the shift control signal $SR_1$.

Figure 10A:
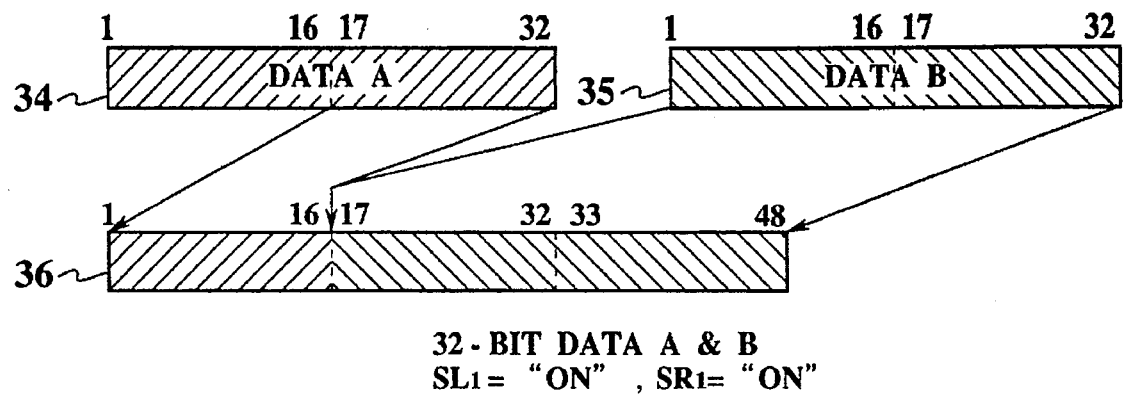
FIG. 10A explanatorily shows a shift operation performed in a 16-bit shifter shown in FIG. 9, pieces of 32-bit data being shifted by 16 bits to left.

For example, in cases where the shift control signal $SL_1$ is "on", a sequence of binary digits held in lower columns of the first data selector 34 ranging from the seventeenth column to the thirty-second column are transferred to upper columns of the 16-bit shifter 36 ranging from the first column to the sixteenth column in that order, as shown in FIG. 10A. In addition, a sequence of binary digits held in upper columns of the second data selector 35 ranging from the first column to the sixteenth column are transferred to middle columns of the 16-bit shifter 36 ranging from the seventeenth to thirty-second columns in that order, as shown in FIG. 10A. That is, a lower portion of the data A held in the selector 34 and an upper portion of the data B held in the selector 35 are shifted to left by 16 bits by the 16-bit shifter 36. Also, the binary digits held in upper columns of the first data selector 34 ranging from the first column to the sixteenth column are abandoned.

Figure 10B:
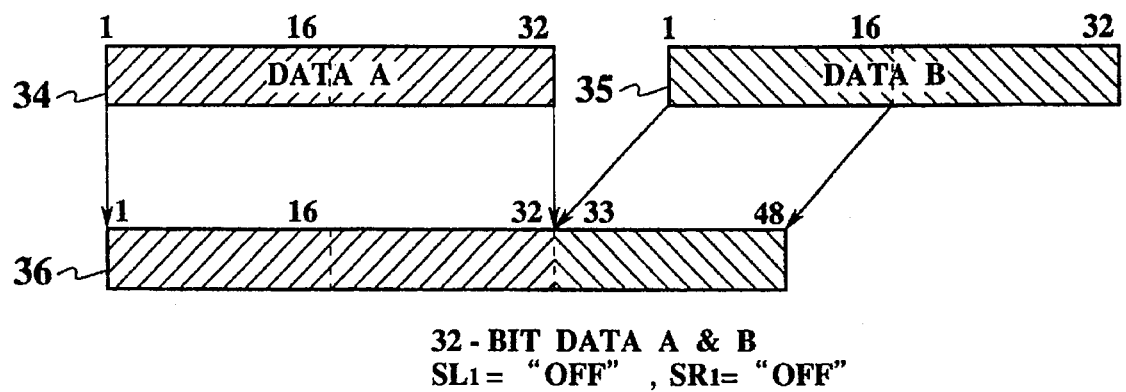
FIG. 10B explanatorily shows a transferring operation performed in a 16-bit shifter shown in FIG. 9, pieces of 32-bit data being not shifted.
Figure 10C:
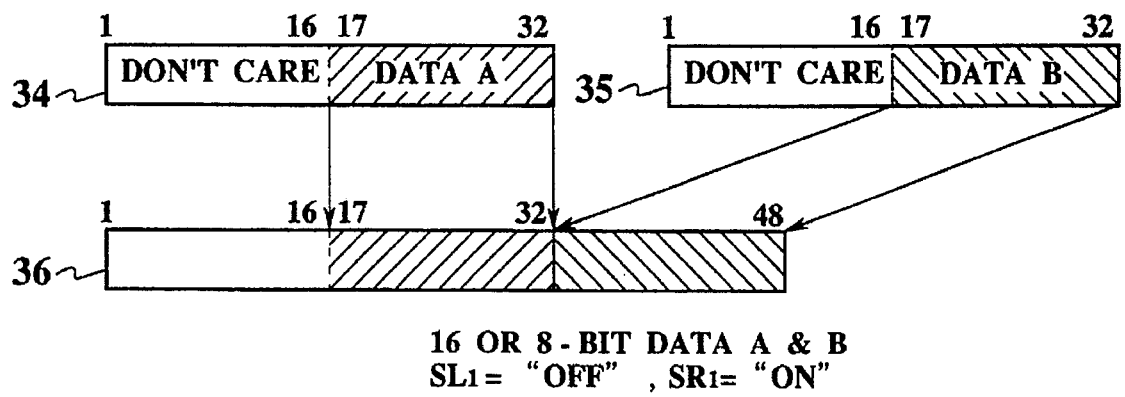
FIG. 10C explanatorily shows an arranging operation performed in a 16-bit shifter shown in FIG. 9, a piece of 16-bit data or a piece of 8-bit data held in a second data selector being shifted by 16 bits to left to form a piece of combined data.

On the other hand, in cases where the shift control signal $SL_1$ is "off", a sequence of binary digits held in entire columns of the first data selector 34 ranging from the first column to the thirty-second column are transferred to entire columns of the 16-bit shifter 36 ranging from the first column to the thirty-second column in that order, as shown in FIGS. 10B, 10C. That is, the data A held in the first data selector 34 is transferred to the upper and middle columns of the 16-bit shifter 36 without shifting the data A.

Also, in cases where the shift control signal $SR_1$ is "on", a sequence of binary digits held in lower columns of the second data selector 35 ranging from the seventeenth column to the thirty-second column are transferred to lower columns of the 16-bit shifter 36 ranging from the thirty-third column to the forty-second column in that order, as shown in FIGS. 10A, 10C. That is, a lower portion of the data B held in the second data selector 35 is shifted by 16 bits by the 16-bit shifter 36. On the other hand, in cases where the shift control signal $SR_1$ is "off", a sequence of binary digits held in upper columns of the second data selector 35 ranging from the first column to the sixteenth column are transferred to lower columns of the 16-bit shifter 36 ranging from the thirty-third column to the forty-second column in that order, as shown in FIG. 10B, That is, an upper portion of the data A held in the second data selector 35 is not shifted by the 16-bit shifter 36.

Accordingly, in cases where the pieces of data A, B held in the data selectors 34, 35 are respectively of 32-bit length, the combined data C is substantially formed in the data selectors 34, 35. Therefore, the shift control signals $SL_1$, $SR_1$ are limited to two types of combinations such as $SL_1$="on" and $SR_1$="on", and $SL_1$="off" and $SR_1$="off". That is, when the combined data C is scheduled to be shifted in the cell array 33 more than or equal to 16 bits, the combination of $SL_1$="on" and $SR_1$="on" is adopted so that the combined data C is shifted by the 16-bit shifter 36, as shown in FIG. 10A. Also, when the combined data C is scheduled to be shifted in the cell array 33 less than 16 bits, the combination of $SL_1$="off" and $SR_1$="off" is adopted so that the combined data C is not shifted by the 16-bit shifter 36, as shown in FIG. 10B.

Also, in cases where the pieces of data A, B held in the data selectors 34, 35 are respectively of 16-bit length or 8-bit length, the shift control signals $SL_1$, $SR_1$ are limited to the combination of $SL_1$="off" and $SR_1$="on", as shown in FIG. 10C. That is, the pieces of 16-bit data A, B are connected in series in the 16-bit selector 36 to form the combined data C.

The cell array 33 further comprises an 8-bit shifter 37 having forty columns for shifting a sequence of binary digits held in the 16-bit shifter 36 by 8 bits in accordance with shift control signals $SL_2$, $SR_2$ and holding the binary digits shifted thereby;

a 4-bit shifter 38 having thirty-six columns for shifting a sequence of binary digits held in the 8-bit shifter 37 by 4 bits in accordance with a shift control signal $S_3$ and holding the binary digits shifted thereby;

a 2-bit shifter 39 having thirty-four columns for shifting a sequence of binary digits held in the 4-bit shifter 38 by 2 bits in accordance with a shift control signal $S_4$ and holding the binary digits shifted thereby;

a 1-bit shifter 40 having thirty-three columns for shifting a sequence of binary digits held in the 2-bit shifter 39 by a bit in accordance with a shift control signal $S_5$ and holding the binary digits shifted thereby; and a 1-bit shifter 41 having thirty-three columns for shifting a sequence of binary digits held in the 1-bit shifter 40 by a bit in accordance with a shift control signal $S_6$ and holding the binary digits shifted thereby.

The shifters 36 to 41 are arranged in series.

In the above configuration of the barrel shifter 31, transference of the binary digits held in the 16-bit shifter 36 to upper and middle columns of the 8-bit shifter 37 ranging from the first column to the thirty-second column is determined in accordance with the shift control signal $SL_2$, while transference of the binary digits held in the 16-bit shifter 36 to lower columns of the 8-bit shifter 37 ranging from the thirty-third column to the fortieth column is determined in accordance with the shift control signal $SR_2$.

Figure 11A:
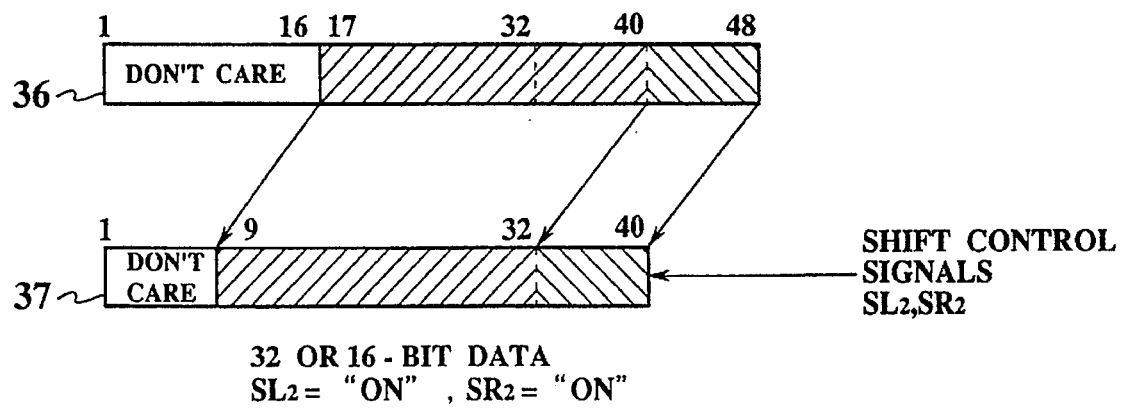
FIG. 11A explanatorily shows a shift operation performed in a 8-bit shifter shown in FIG. 9, a piece of combined databeing shifted by 8 bits to left.
Figure 11B:
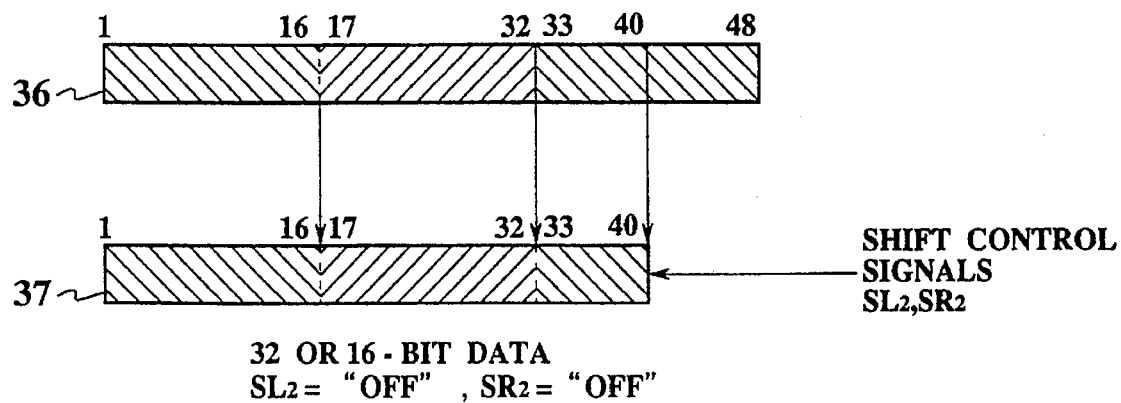
FIG. 11B explanatorily shows a transferring operation performed in a 8-bit shifter shown in FIG. 9, a piece of combined data being not shifted.

For example, in cases where the shift control signal $SL_2$ provided to the 8-bit shifter 37 is "on", as shown in FIG. 11A, the binary digits held in columns of the 16-bit shifter 36 ranging from the seventeenth column to the fortieth column are transferred to columns of the 8-bit shifter 37 ranging from the ninth column to the thirty-second column in that order. On the other hand, in cases where the shift control signal $SL_2$ provided to the 8-bit shifter 37 is "off", as shown in FIGS. 11B, 11C, the binary digits held in the upper and lower columns of the 16-bit shifter 36 ranging from the first to thirty-second column are transferred to upper and lower columns of the 8-bit shifter 37 ranging from first to thirty-second column.

Figure 11C:
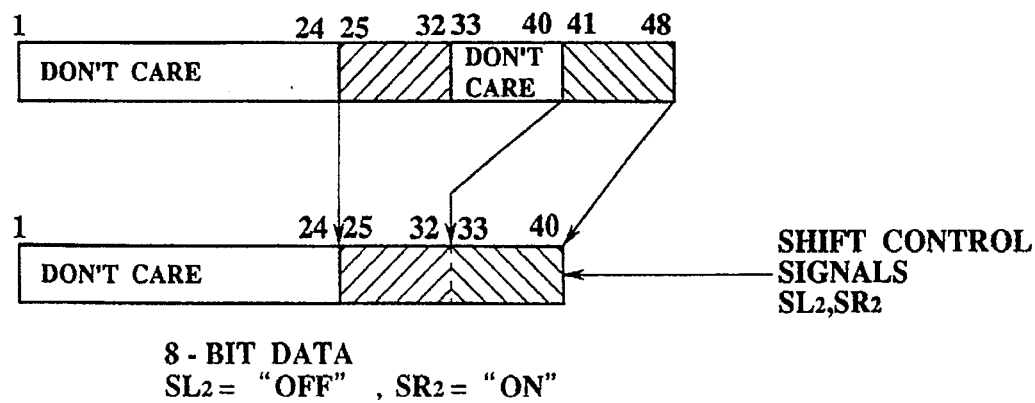
FIG. 11C explanatorily shows an arranging operation performed in a 8-bit shifter shown in FIG. 9, a piece of 8-bit data shifted in a 16-bit shifter being shifted by 8 bits to left to form a piece of combined data.

Also, in cases where the shift control signal $SR_2$ provided to the 8-bit shifter 37 is "on", as shown in FIGS. 11A, 11C, the binary digits held in columns of the 16-bit shifter 36 ranging from the forty-first column to the forty-eighth column are transferred to lower columns of the 8-bit shifter 37 ranging from the thirty-third column to the fortieth column. On the other hand, in cases where the shift control signal $SR_2$ provided to the 8-bit shifter 37 is "off", as shown in FIG. 11B, the binary digits held in columns of the 16-bit shifter 36 ranging from the thirty-third column to the fortieth column are transferred to the lower columns of the 8-bit shifter 37 ranging from thirty-third column to the fortieth column.

Accordingly, in cases where the pieces of data A, B held in the data selectors 34, 35 are respectively of 32-bit length or 16-bit length, the combined data C is formed in the 16-bit shifter 36. Therefore, the shift control signals $SL_2$, $SR_2$ are limited to two types of combinations such as $SL_2$="on" and $SR_2$="on", and $SL_2$="off" and $SR_2$="off". That is, when the combined data C is scheduled to be shifted in the cell array 33 by $N_1$ bits ($N_1 \geq 24$ for only 32-bit data A or $8 \leq N_1 \leq 15$), the combination of $SL_2$="on" and $SR_2$="on" is adopted so that the combined data C is shifted by the 8-bit shifter 37, as shown in FIG. 11A. Also, when the combined data C is scheduled to be shifted in the cell array 33 by $N_2$ bits ($N_2 \leq 7$ or $16 \leq N_2 \leq 23$), the combination of $SL_2$="off" and $SR_2$="off" is adopted so that the combined data C is not shifted by the 8-bit shifter 37, as shown in FIG. 11B.

Also, in cases where the pieces of data A, B held in the data selectors 34, 35 are respectively of 8-bit length, the shift control signals $SL_2$, $SR_2$ are limited to the combination of $SL_2$="off" and $SR_2$="on", as shown in FIG. 11C. That is, the pieces of data A, B are connected in series in the 8-bit shifter 37 to form the combined data C.

As a result, regardless of whether the pieces of data A, B are of 32-bit length, 16-bit length or 8-bit length, the combined data C is held in the 8-bit selector 37.

Therefore, the combined data C held in the 8-bit shifter 37 is shifted one after another to left in accordance with the shift control signals $S_3$, $S_4$, $S_5$ and $S_6$ in the 4-bit selector 38, the 2-bit selector 39, and the 1-bit selectors 40, 41.

Thereafter, in cases where the pieces of data A, B selected by the selectors 34, 35 are respectively of 32-bit length, a sequence of binary digits held in upper columns of the 1-bit selector 41 ranging from the first column to the thirty-second column are shifted out as the output data D. Also, in cases where the pieces of data A, B selected by the selectors 34, 35 are respectively of 16-bit length, a sequence of binary digits held in columns of the 1-bit selector 41 ranging from the seventeenth column to the thirty-second column are shifted out as the output data D. In addition, in cases where the pieces of data A, B selected by the selectors 34, 35 are respectively of 8-bit length, a sequence of binary digits held in columns of the 1-bit selector 41 ranging from the twenty-fifth column to the thirty-second column are shifted out as the output data D.

Figure 1:
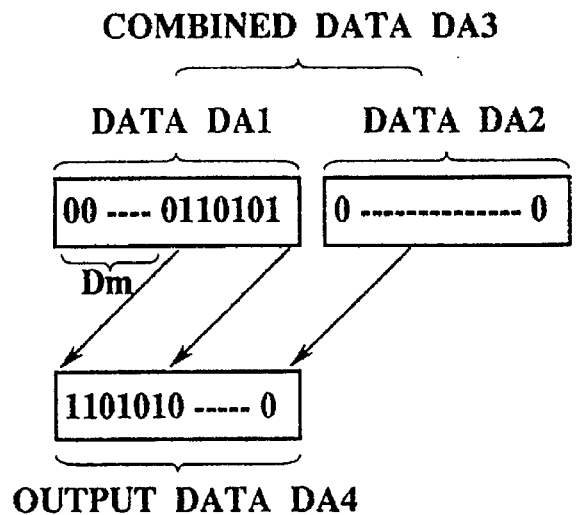
FIG. 1 shows a sequence of binary digits held in columns, explanatorily illustrating concept of a type of arithmetic shift.
Figure 2:
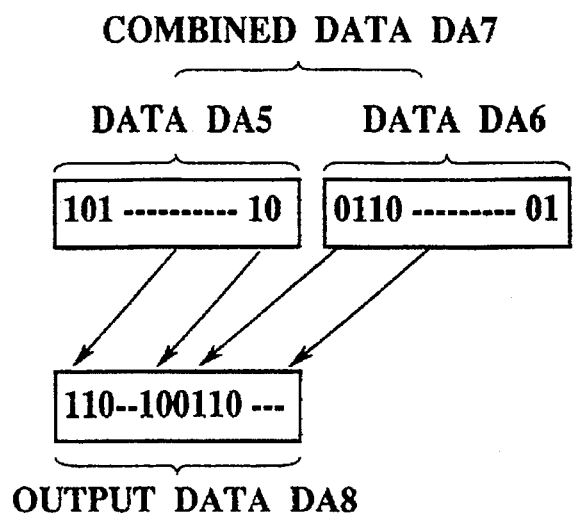
FIG. 2 shows a sequence of binary digits held in columns, explanatorily illustrating concept of a type of double shift.
Figure 3:
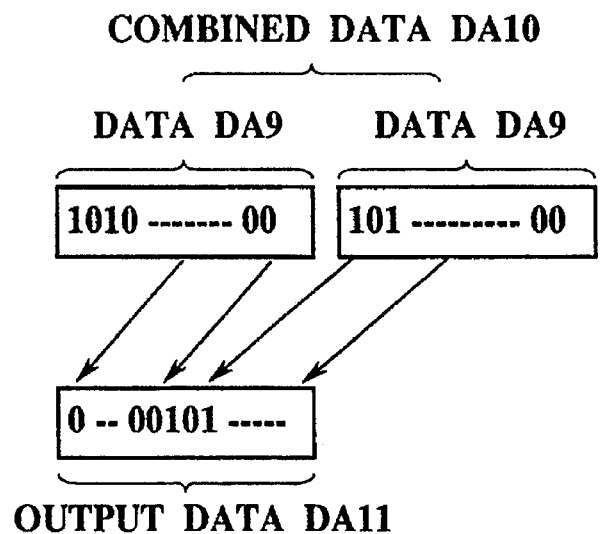
FIG. 3 shows a sequence of binary digits held in columns, explanatorily illustrating concept of a type of rotating shift.
Figure 4:
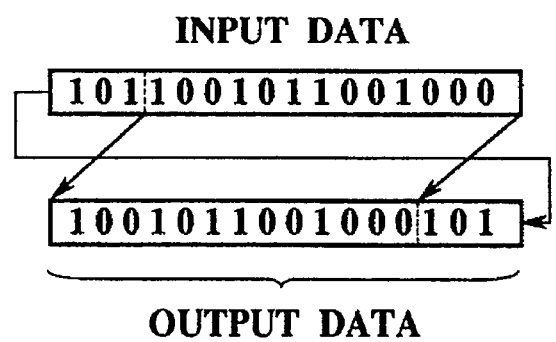
FIG. 4 shows a sequence of binary digits held in columns, explanatorily illustrating the rotation of the binary digits shifted in accordance with the rotating shift.
Figure 5:
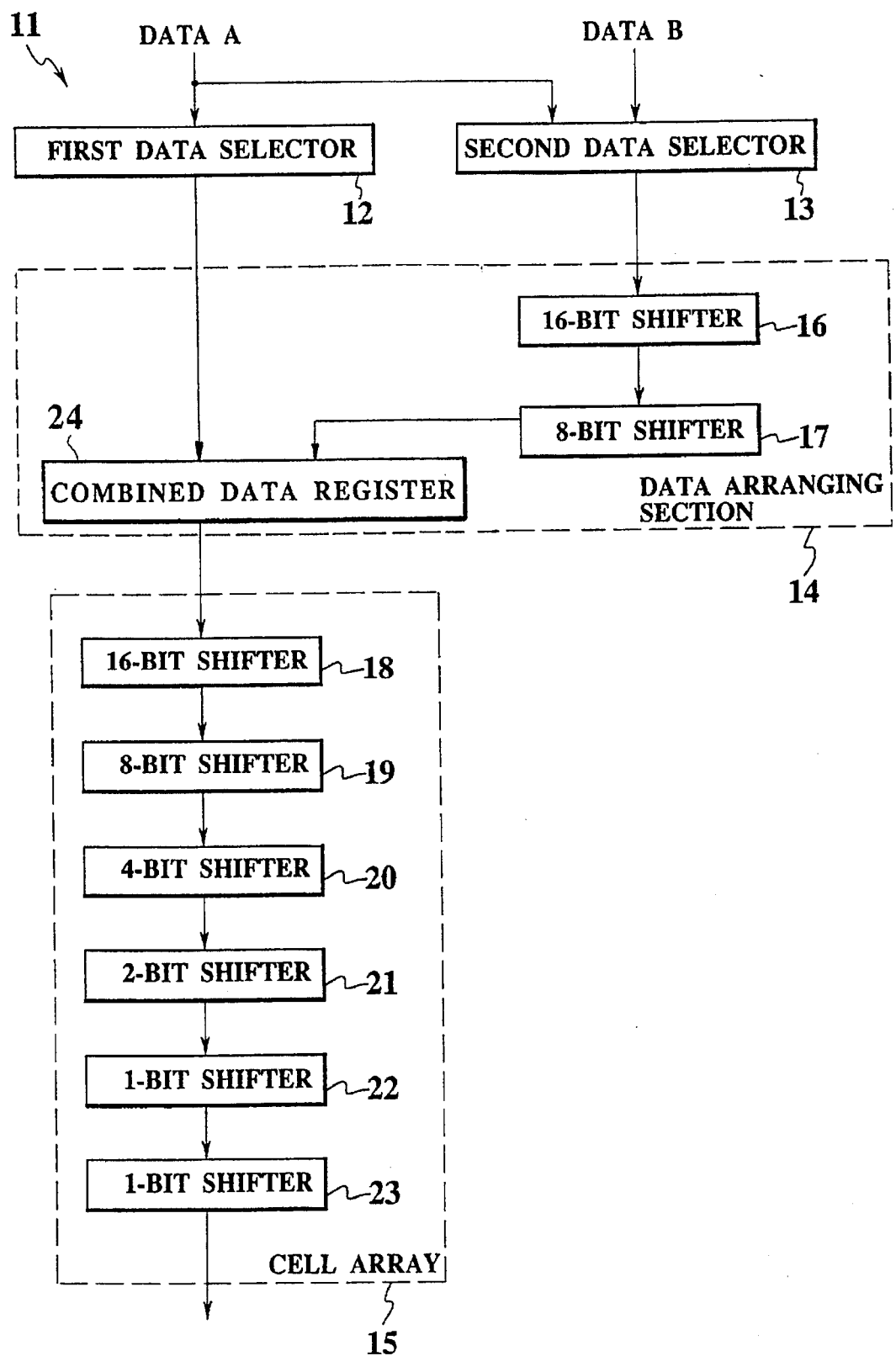
FIG. 5 is a block diagram of a conventional barrel shifter in which two pieces of data are connected in series to form a combined data and are shifted by some bits to perform a shift operation such as the arithmetic shift, the rotating shift or the double shift.
Figure 6:
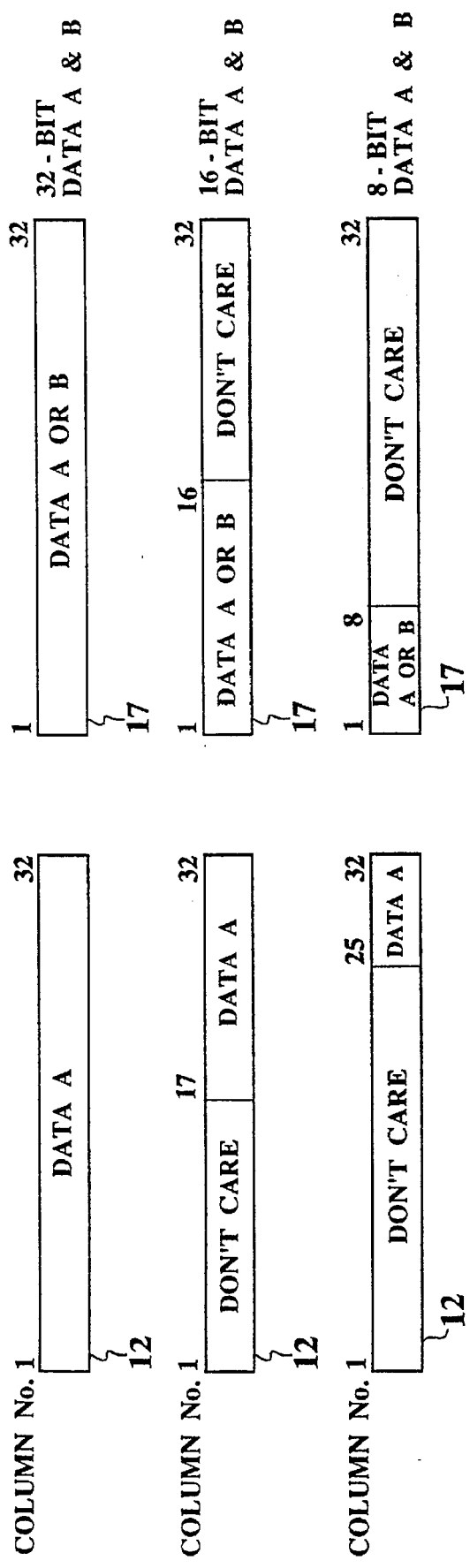
FIG. 6 shows arrangements of both a piece of data selected by a first data selector shown in FIG. 5 and a piece of data arranged in a data arranging section shown in FIG. 5.
Figure 7A:
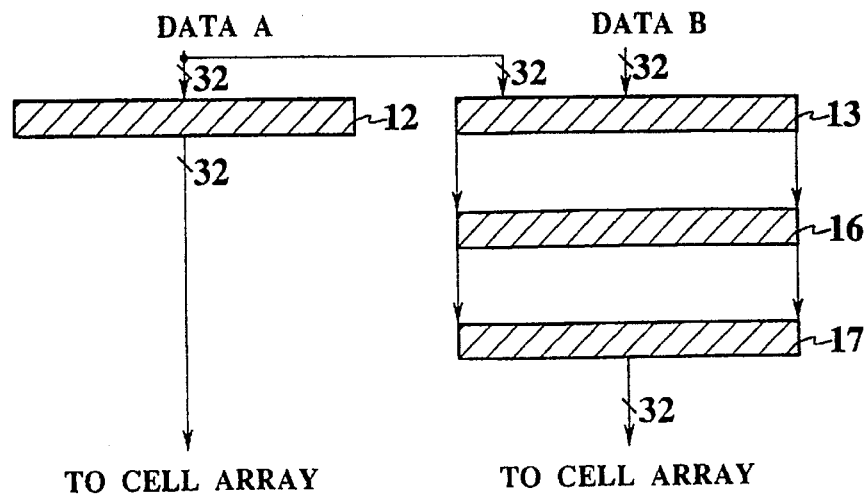
FIG. 7A shows the arrangement of pieces of 32-bit data received in the conventional barrel shifter shown in FIG. 5.
Figure 7B:
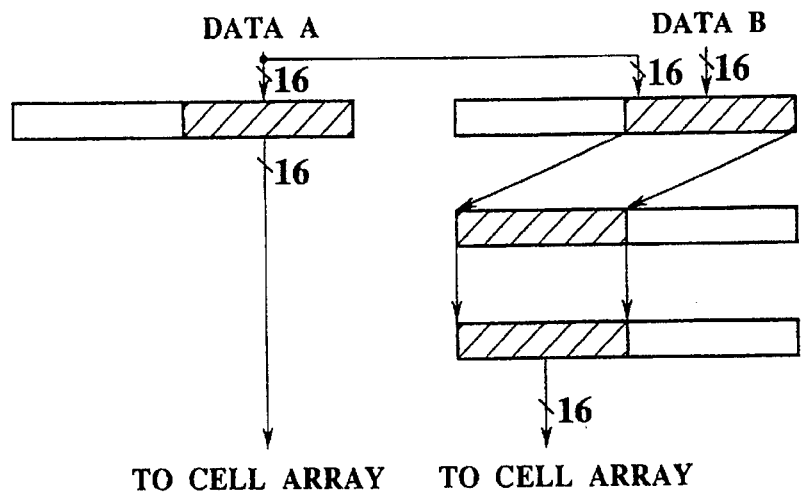
FIG. 7B shows the arrangement of pieces of 16-bit data received in the conventional barrel shifter shown in FIG. 5.
Figure 7C:
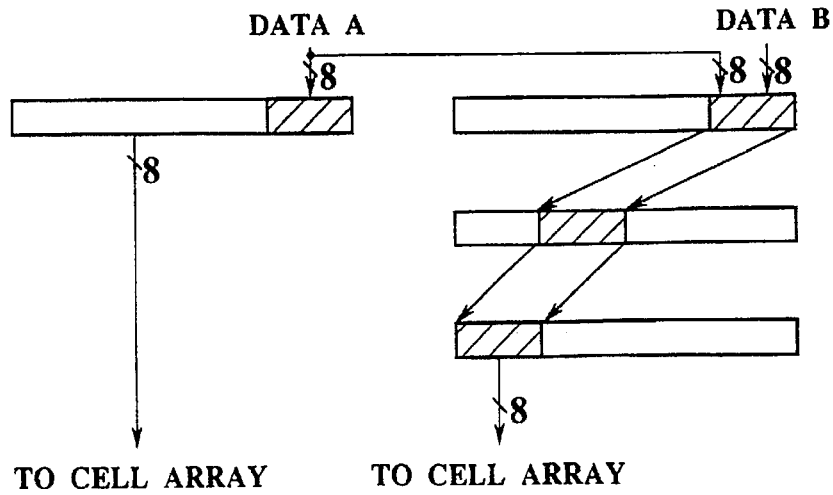
FIG. 7C shows the arrangement of pieces of 8-bit data received in the conventional barrel shifter shown in FIG. 5.
Figure 8:
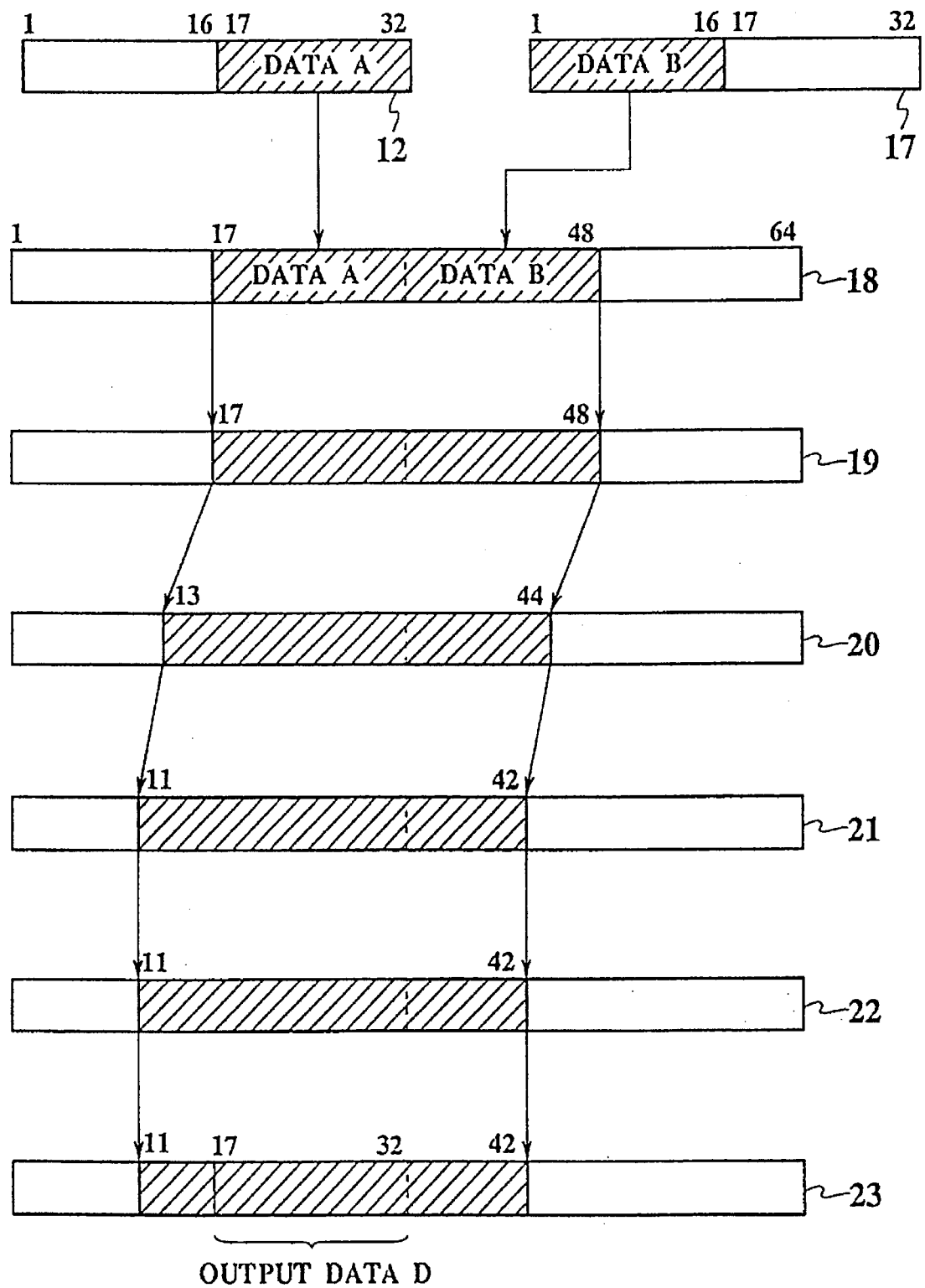
FIG. 8 explanatorily shows a shift operation performed in the cell array shown in FIG. 5, a piece of combined data being shifted by some bits to left.

Next, the difference in operations between the barrel shifter 31 according to the present invention and the conventional barrel shifter 11 shown in FIG. 5 is described.

First, in cases where the pieces of data A, B selected by the data selectors 34, 35 are respectively of 32-bit length, after the data A is selected by the first data selector 34 and the data B is selected by the second data selector 35, the combined data C formed by connecting the pieces of data A, B in series is shifted to left by 16 bits in the 16-bit shifter 36, if necessary, as shown in FIG. 10A. Thereafter, the combined data C is shifted to left by 8 bits in the 8-bit shifter 37, if necessary, as shown in FIG. 11A. In other words, the data arranging section 14 provided with the 16-bit shifter 16 and the 8-bit shifter 17 in the conventional barrel shifter 11 is not required because the pieces of data A, B held in the data selectors 34, 35 are substantially connected in series to form the combined data C.

Accordingly, the 32-bit length data A, B can be shifted in the barrel shifter 31 in accordance with the shift operation without utilizing an additional section equivalent to the data arranging section 14 in the conventional barrel shifter 11.

Secondary, in cases where the pieces of data A, B selected by the data selectors 34, 35 are of 16-bit length, the data A selected by the first data selector 12 would be perfectly abandoned if the 16-bit shifter 18 were operated to shift the combined data C by 16 bits. Therefore, the 16-bit shifter 18 of the conventional barrel shifter 11 is not absolutely operated to shift the combined data C. As a result, it is not necessary to install the 16-bit shifter 18 in the conventional barrel shifter 11.

Accordingly, functions achieved by the 16-bit shifters 16, 18 of the conventional barrel shifter 11 is achieved by the 16-bit shifter 36 of the barrel shifter 31.

Also, because the pieces of data A, B selected by the data selectors 34, 35 are necessarily connected in series in the 16-bit shifter 36 of the barrel shifter 31 to form the combined data C, it is not necessary to stall an additional shifter equivalent to the 8-bit shifter 17 of the data arranging section 14 in the conventional barrel shifter 11.

Accordingly, the combined data C can be shifted in the barrel shifter 31 in accordance with the shift operation without utilizing an additional section equivalent to the data arranging section 14 in the conventional barrel shifter 11.

Thirdly, in cases where the pieces of data A, B selected by the selectors 34, 35 are of 8-bit length, the combined data C would be abandoned if the 16-bit shifter 18 of the conventional barrel shifter 11 were operated to shift the combined data C by 16 bits. Therefore, the 16-bit shifter 18 is not absolutely operated to shift the combined data C. Also, if the 8-bit shifter 19 of the conventional barrel shifter 11 were operated to shift the combined data C by 8 bits, the data A would be abandoned. Therefore, the 8-bit shifter 19 is not absolutely operated to shift the combined data C. Therefore, it is not necessary to install both the 16-bit shifter 18 and the 8-bit shifter 19 of the conventional barrel shifter 11.

Accordingly, functions achieved by the 16-bit shifters 16, 18 and the 8-bit shifters 17, 19 of the conventional barrel shifter 11 are achieved by both the 16-bit shifter 36 and the 8-bit shifter 37 of the barrel shifter 31.

In other words, the combined data C can be formed and shifted in the barrel shifter 31 in accordance with the shift operation without utilizing a section equivalent to the data arranging section 14 in the conventional barrel shifter 11.

As a result, an additional section equivalent to the data arranging section 14 in the conventional barrel shifter 11 can be omitted in the barrel shifter 31, regardless of the length of the data selected by the data selectors 34, 35.

Accordingly, a small-sized barrel shifter can be manufactured according to the present invention.

Also, because the additional section equivalent to the data arranging section 14 in the conventional barrel shifter 11 is omitted, the number of shifters 36 to 42 in which the piece of data A, B are transferred is decreased in the barrel shifter 31 as compared with the number of selectors 16 to 23 in the conventional barrel shifter 11. Accordingly, the shift operation can be performed at a high speed in the barrel shifter 31 as compared with that in the conventional barrel shifter 11.

In addition, because the number of shifters 36 to 42 is decreased in the barrel shifter 31 as compared with the number of selectors 16 to 23 in the conventional barrel shifter 11, the shift control signals respectively provided to each of the shifters can be simplified.

Specifically, the shift control signals $SL_1$, $SR_1$ provided to the 16-bit shifter 36 are limited to three types of combinations such as $SL_1$="on" and $SR_1$="on", $SL_1$="off" and $SR_1$="off", and $SL_1$="off" and $SR_1$="on", and the shift control signals $SL_2$, $SR_2$ provided to the 8-bit shifter 37 are limited to three types of combinations such as $SL_2$="on" and $SR_2$="on", $SL_2$="off" and $SR_2$="off", and $SL_2$="off" and $SR_2$="on". Therefore, even though functions achieved by the 16-bit shifters 16, 18 and the 8-bit shifters 17, 19 of the conventional barrel shifter 11 are achieved by both the 16-bit shifter 36 and the 8-bit shifter 37 of the barrel shifter 31, a control system providing the shift control signals $SL_1$, $SR_1$, $SL_2$, and $SR_2$ is not complicated.

Accordingly, the shift operation can be performed by utilizing a simplified control system in the barrel shifter 31 according to the present invention.

In cases where the data B selected by the second data selector 35 is represented by a sequence of zero digits, the arithmetic shift is performed in the barrel shifter 31. Also, in cases where the data B selected by the second data selector 35 is represented by a sequence of binary digits differing from those of the data A selected by the first data selector 34, the double shift is performed in the barrel shifter 31. In addition, in cases where the data B agrees with the data A, the rotating shift is performed in the barrel shifter 31.

Next, a second embodiment of a barrel shifter, in which a pair of pieces of 16-bit data or a pair of pieces of 8-bit data is selected and shifted, is described with reference to FIGS. 12, 13.

Figure 12:
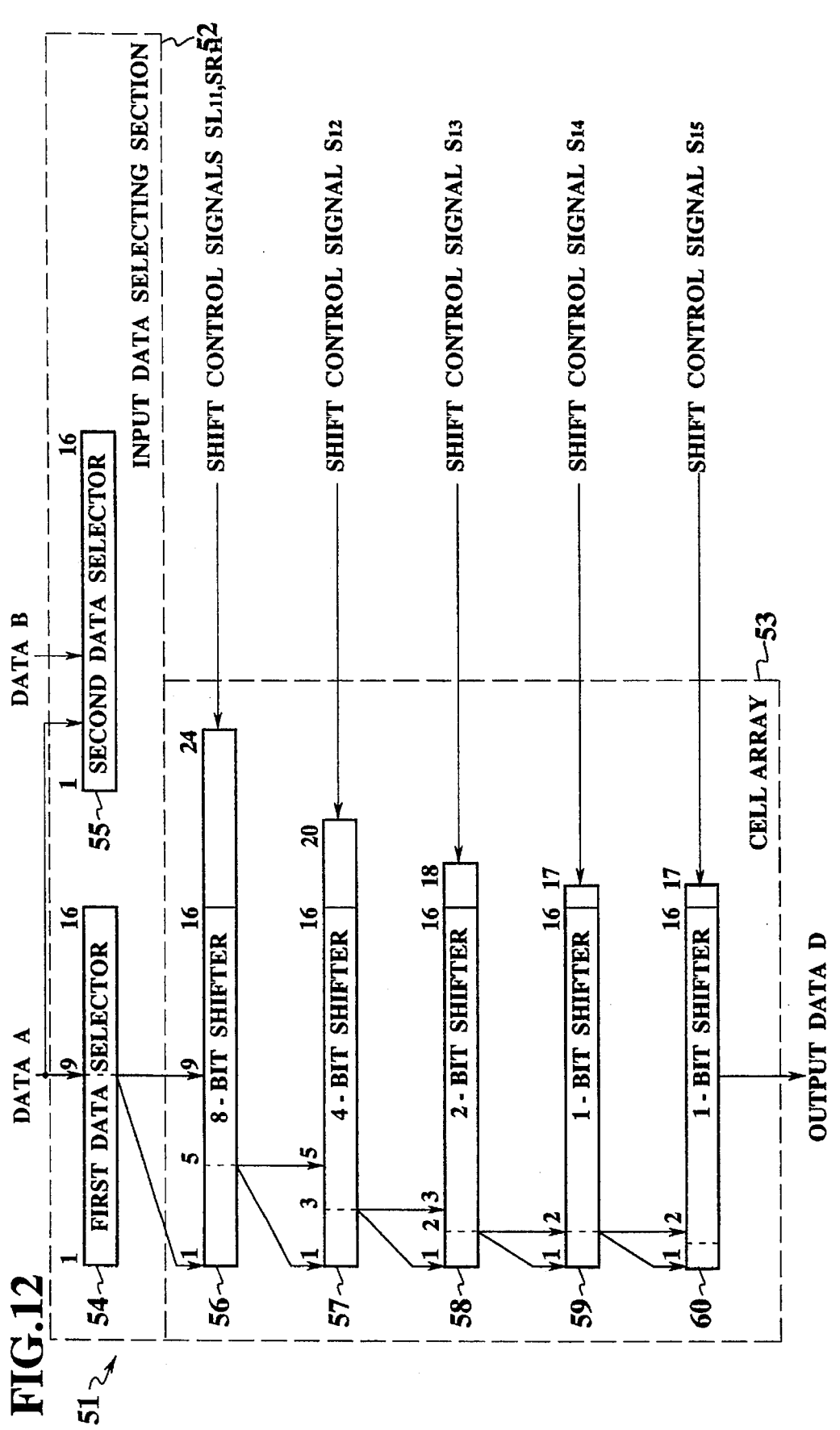
FIG. 12 is a block diagram of a barrel shifter in which a pair of pieces of of 16-bit data or a pair of pieces of 8-bit data is selected and shifted according to a second embodiment of the present invention.

FIG. 12 is a block diagram of a barrel shifter in which a pair of pieces of 16-bit data or a pair of pieces of 8-bit data is selected and shifted according to a second embodiment of the present invention.

As shown in FIG. 12, a barrel shifter 51 according to the second embodiment comprises an input data selecting section 52 for selecting pieces of 16-bit input data A, B or pieces of 8-bit input data A, B from among large pieces of data provided from data sources (not shown) and temporarily holding the data selected thereby, and a cell array 53 for shifting a piece of combined data C formed by connecting the pieces of input data A, B selected by the input data selecting section 52 in series to shift out a piece of output data D.

The input data selecting section 52 comprises a first data selector 54 for selecting the input data A from among pieces of data provided from the data sources, and a second data selector 55 for selecting either the data A or the data B provided from the data sources. In this case, the data B is selected by the second data selector 55 to simplify the description of the second embodiment.

Each of the data selectors 54, 55 has sixteen columns. Therefore, the least significant bit of the data A is held at the sixteenth column of the first data selector 54. Also, the least significant bit of the data B is held at the sixteenth column of the second data selector 55.

The cell array 53 comprises:

a 8-bit shifter 56 having twenty-four columns for shifting the data A held in the first data selector 54 and the data B held in the second data selector 55 in accordance with shift control signals $SL_{11}$, $SR_{11}$ and holding the pieces of data A, B shifted thereby;

a 4-bit shifter 57 having twenty columns for shifting a sequence of binary digits held in the 8-bit shifter 56 by 4 bits in accordance with a shift control signal $S_{12}$ and holding the binary digits shifted thereby;

a 2-bit shifter 58 having eighteen columns for shifting a sequence of binary digits held in the 4-bit shifter 57 by 2 bits in accordance with a shift control signal $S_{13}$ and holding the binary digits shifted thereby;

a 1-bit shifter 59 having seventeen columns for shifting a sequence of binary digits held in the 2-bit shifter 58 by a bit in accordance with a shift control signal $S_{14}$ and holding the binary digits shifted thereby; and a 1-bit shifter 60 having seventeen columns for shifting a sequence of binary digits held in the 1-bit shifter 59 by a bit in accordance with a shift control signal $S_{15}$ and holding the binary digits shifted thereby.

The shifters 56 to 60 are arranged in series.

In the above configuration of the barrel shifter 51, transference of the binary digits held in the data selectors 54, 55 to upper and middle columns of the 8-bit shifter 56 ranging from the first column to the sixteenth column is determined in accordance with the shift control signal $SL_{11}$, while transference of the binary digits held in the data selectors 54, 55 to lower columns of the 8-bit shifter 56 ranging from the seventeenth column to the twenty-fourth column is determined in accordance with the shift control signal $SR_{11}$.

Figure 13A:
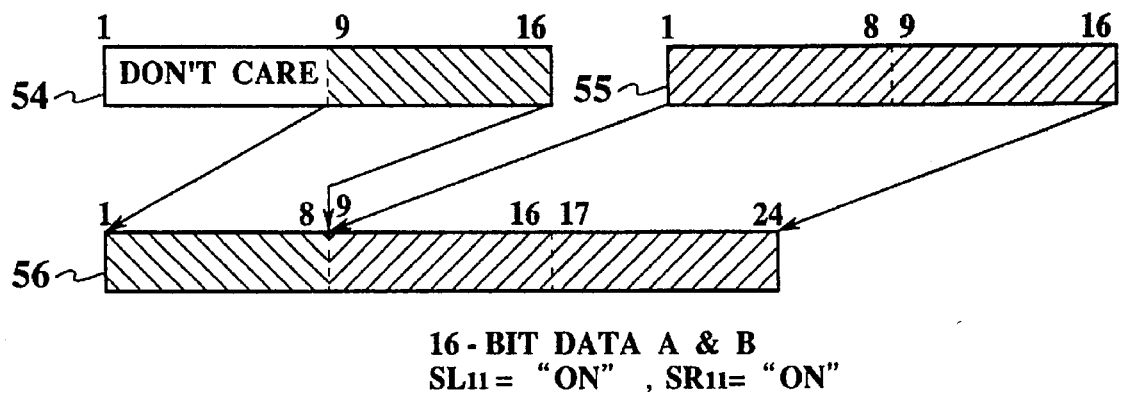
FIG. 13A explanatorily shows a shift operation performed in a 8-bit shifter shown in FIG. 12, a piece of 16-bit databeing shifted by 8 bits to left.

For example, in cases where the shift control signal $SL_{11}$ is "on", a sequence of binary digits held in lower columns of the first data selector 54 ranging from the ninth column to the sixteenth column are transferred to the upper columns of the 8-bit shifter 56 ranging from the first column to the eighth column in that order, as shown in FIG. 13A. In addition, as shown in FIG. 13A, a sequence of binary digits held in upper columns of the second data selector 55 ranging from the first column to the eighth column are transferred to the middle columns of the 8-bit shifter 56 ranging from the ninth column to the sixteenth column in that order. That is, lower binary digits of the data A held in the first data selector 54 and upper binary digits of the data B held in the second data selector 55 are shifted to left by 8 bits by the 8-bit shifter 56. Also, the binary digits held in upper columns of the first data selector 54 ranging from the first column to the eighth column are abandoned.

Figure 13B:
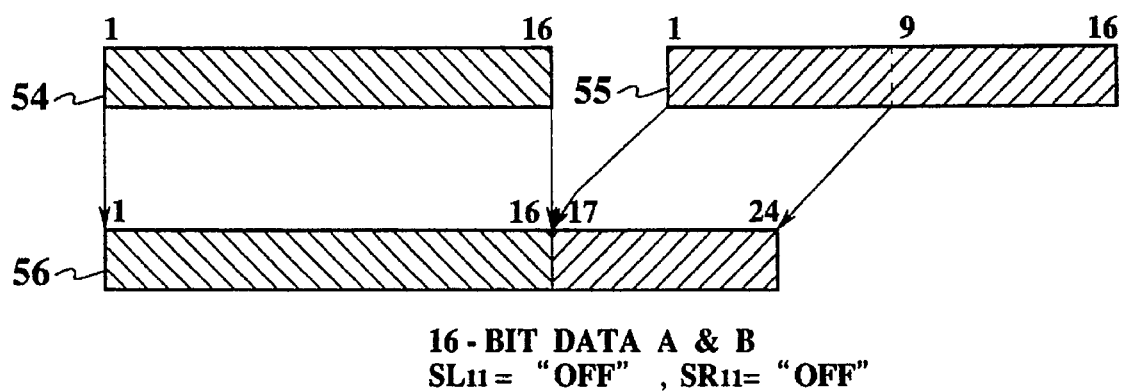
FIG. 13B explanatorily shows a transferring operation performed in a 8-bit shifter shown in FIG. 12, a piece of 16-bit data being not shifted.
Figure 13C:
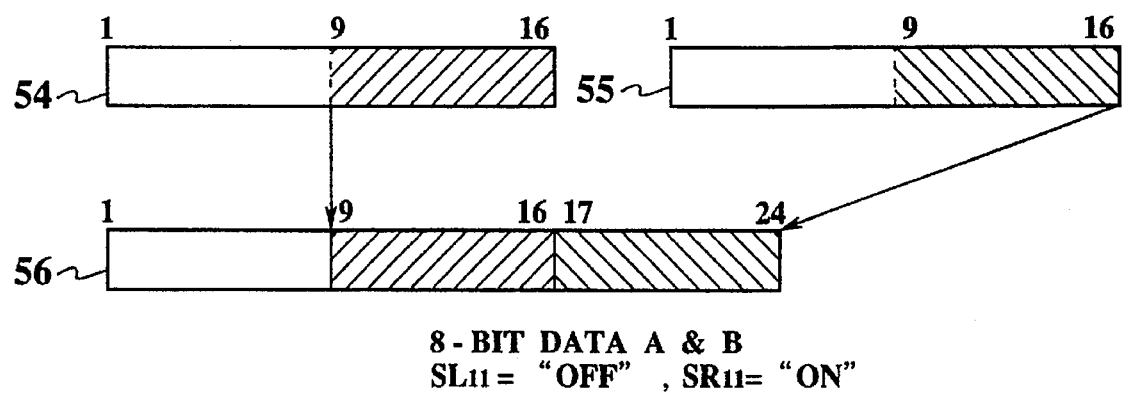
FIG. 13C explanatorily shows an arranging operation performed in a 8-bit shifter shown in FIG. 12, a piece of 8-bit data held in a second data selector being shifted by 8 bits to left to form a piece of combined data.

On the other hand, in cases where the shift control signal $SL_{11}$ is "off", a sequence of binary digits held in entire columns of the first data selector 54 ranging from the first column to the sixteenth column are transferred to the upper and middle columns of the 8-bit shifter 56 ranging from the first column to the sixteenth column in that order, as shown in FIGS. 13B, 13C. That is, the data A held in the first data selector 54 is transferred to the 8 bit shifter 56 without shifting the data A.

Also, in cases where the shift control signal $SR_{11}$ is "on", a sequence of binary digits held in lower columns of the second data selector 55 ranging from the ninth column to the sixteenth column are transferred to the lower columns of the 8-bit shifter 56 ranging from the seventeenth column to the twenty-fourth column in that order, as shown in FIGS. 13A, 13C. That is, lower binary digits of the data B held in the second data selector 55 are shifted by 8 bits by the 8-bit shifter 56.

On the other hand, in cases where the shift control signal $SR_{11}$ is "off", a sequence of binary digits held in the upper columns of the second data selector 55 ranging from the first column to the eighth column are transferred to the lower columns of the 8-bit shifter 56 ranging from the seventeenth column to the twenty-fourth column in that order, as shown in FIG. 13B. That is, upper binary digits of the data B held in the second data selector 55 are not shifted by the 8-bit shifter 56, and the lower binary digits of the data B are abandoned.

Accordingly, in cases where the pieces of data A, B held in the data selectors 54, 55 are respectively of 16-bit length, the shift control signals $SL_{11}$, $SR_{11}$ are limited to the combination of $SL_{11}$="on" and $SR_{11}$="on", or $SL_{11}$="off" and $SR_{11}$="off". That is, when the combined data C is scheduled to be shifted in the cell array 53 more than or equal to 8 bits, the combination of $SL_{11}$="on" and $SR_{11}$="on" is adopted so that the combined data C is shifted by the 8-bit shifter 56, as shown in FIG. 13A. Also, when the combined data C is scheduled to be shifted in the cell array 53 less than 8 bits, the combination of $SL_{11}$="off" and $SR_{11}$="off" is adopted so that the combined data C is not shifted by the 8-bit shifter 56, as shown in FIG. 13B.

Also, in cases where the pieces of data A, B held in the data selectors 54, 55 are respectively of 8-bit length, the shift control signals $SL_{11}$, $SR_{11}$ are limited to the combination of $SL_{11}$="off" and $SR_{11}$="on", as shown in FIG. 13C. That is, the pieces of 8-bit data A, B are connected in series in the 8-bit selector 56 to form the combined data C.

As a result, regardless of whether the pieces of data A, B are of 16-bit length or 8-bit length, the combined data C exists in the 8-bit selector 57.

Therefore, after the combined data C is held in the 8-bit shifter 57, the combined data C is shifted as necessary to left in accordance with the shift control signals $S_{12}$, $S_{13}$, $S_{14}$, and $S_{15}$ in the 4-bit selector 57, the 2-bit selector 58, and the 1-bit selectors 59, 60.

Thereafter, in cases where the pieces of data A, B selected by the data selectors 54, 55 are of 16-bit length, a sequence of binary digits held in columns of the 1-bit selector 60 ranging from the first column to the sixteenth column are shifted out as the output data D. In addition, in cases where the pieces of data A, B selected by the data selectors 54, 55 are of 8-bit length, a sequence of binary digits held in columns of the 1-bit selector 41 ranging from the ninth column to the sixteenth column are shifted out as the output data D.

Accordingly, because an additional section equivalent to the data arranging section 14 of the conventional barrel shifter 11 is not required in the barrel shifter 51 according to the second embodiment of the present invention, a small-sized barrel shifter can be manufactured.

Also, because the additional section is not installed in the barrel shifter 51, the shift operations such as the arithmetic shift, the rotating shift and the double shift can be performed at a high speed.

In addition, because only three types of combinations of the shift control signals $SL_{11}$, $SR_{11}$ such as $SL_{11}$="on" and $SR_{11}$="on", $SL_{11}$="off" and $SR_{11}$="off", and $SL_{11}$="off" and $SR_{11}$="on" are required to shift the data held in the data selectors 54, 55, a control system for providing the shift control signals $SL_{11}$, $SR_{12}$, $S_{13}$, $S_{14}$, and $S_{15}$ to the shifters 56 to 60 can be simplified to perform the shift operations.

Furthermore, in cases where a piece of 32-bit data is not processed, the shift operations can be operated by utilizing the barrel shifter 51 which is simplified more than the barrel shifter 31. That is, either the barrel shifter 31 or the barrel shifter 51 can be utilized, depending on the objective.

The shifters composing the barrel shifter 31 or 51 are arranged in order of the number of bits shifted therein. However, the arrangement of the shifters is not limited to the order. That is, it is preferred that the shifters be arranged in series in arbitrary order.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A barrel shifter comprising:

a first data selector configured to hold first input data of at most N bits;

a second data selector configured to hold second input data of at most N bits; and a plurality of shifters connected in a series arrangement and configured to carry out a shift operation of one of a plurality of shift amounts, said plurality of shifters including a top shifter of 3N/2 bits being directly connected to said first and second data selectors and configured to receive said first and second input data, each of remaining said plurality of shifters performing a necessary shift operation by selecting bit positions of a preceding one of said plurality of shifters in said series arrangement from which data is received in accordance with a respective shift control signal corresponding to said one of a plurality of shift amounts;

said top shifter operating in one of a first, second and third mode in accordance with said respective shift control signal for said top shifter, said top shifter outputting first output data of 3N/2 bits such that, in the first mode, the least significant N/2 bits of said first input data is output as the most significant N/2 bits of said first output data and said N bits of said second input data is output as the least significant N bits of said first output data, in the second mode, the N bits of said first input data is output as the most significant N bits of said first output data and the most significant N/2 bits of said second input data is output as the least significant N/2 bits of said first output data, and in the third mode, the least significant N/2 bits of said first input data is output as the intermediate N/2 bits located between the most significant N/2 bits and the least significant N/2 bits of said first output data and the least significant N/2 bits of said second input data is output as the least significant N/2 bits of said first output data, wherein said plurality of shifters further comprise:

a first shifter directly connected to said top shifter and configured to provide a first shift amount greater than or equal to 0 bits and less than or equal to N/4 bits to said first output data, said first shifter outputting second output data as a result thereof, wherein an amount of said first shift amount provided by said first shifter is based on said respective shift control signal received by said first shifter;

a second shifter directly connected to said first shifter and configured to provide a second shift amount greater than or equal to 0 bits and less than or equal to N/8 bits to said second output data, said second shifter outputting third output data as a result thereof, wherein an amount of said second shift amount provided by said second shifter is based on said respective shift control signal received by said second shifter;

a third shifter directly connected to said second shifter and configured to provide a third shift amount greater than or equal to 0 bits and less than or equal to N/16 bits to said third output data, said third shifter outputting fourth output data as a result thereof, wherein an amount of said third shift amount provided by said third shifter is based on said respective shift control signal received by said third shifter;

a fourth shifter directly connected to said third shifter and configured to provide a fourth shift amount greater than or equal to 0 bits and less than or equal to N/32 bits to said fourth output data, said fourth shifter outputting fifth output data as a result thereof, wherein an amount of said fourth shift amount provided by said fourth shifter is based on said respective shift control signal received by said fourth shifter; and a fifth shifter directly connected to said fourth shifter and configured to provide a fifth shift amount greater than or equal to 0 bits and less than or equal to N/32 bits to said fifth output data, said fifth shifter outputting sixth output data as a result thereof, wherein an amount of said fifth shift amount provided by said fifth shifter is based on said respective shift control signal received by said fifth shifter, wherein each of said respective shift control signals for said top shifter and said first through fifth shifters include a right shift control signal and a left shift control signal, each of which can be ON of OFF, and wherein said first shifter operates in one of a first, second and third mode in accordance with said respective shift control signal for said first shifter, said first shifter outputting said second output data of 5N/4 bits such that, in the first mode, the least significant N bits of said first output data received from said top shifter is output as the least significant N bits of said second output data, in the second mode, the most significant 5N/4 bits of said first output data received from said top shifter is output as the 5N/4 bits of said second output data in said second mode, and in the third mode, the least significant N/4 bits of said first output data received from said top shifter is output as the least significant N/4 bits of said second output data and the third least significant group of N/4 bits of said first output data received from said top shifter is output as the second least significant group of N/4 bits of said second output data.

2. A barrel shifter according to claim 1, wherein N is equal to 32.

3. A barrel shifter according to claim 1, wherein said first shifter is in said first mode when said respective left shift control signal for said first shifter is ON and said respective right shift control signal for said first shifter is ON, said first shifter is in said second mode when said respective left shift control signal for said first shifter is OFF and said respective right shift control signal for said first shifter is OFF, and said first shifter is in said third mode when said respective left shift control signal for said first shifter is OFF and said respective right shift control signal for said first shifter is ON.

4. A barrel shifter according to claim 3, wherein N is equal to an integer multiple of 32, and wherein the first shifter has a capacity of 5N/4 bits.

5. A barrel shifter according to claim 3, wherein the second shifter has a capacity of 9N/8 bits.

6. A barrel shifter according to claim 5, wherein the third shifter has a capacity of 17N/16 bits.

7. A barrel shifter according to claim 6, whrein each of the fourth and fifth shifters has a capacity of 33N/32 bits.

8. A barrel shifter comprising:
a first data selector configured to hold first input data of at most 16 bits;
a second data selector configured to hold second input data of at most 16 bits; and
a plurality of shifters connected in a series arrangement and configured to carry out a shift operation of one of a plurality of shift amounts, said plurality of shifters including a top shifter of 24 bits being directly connected to said first and second data selectors and configured to receive said first and second input data, each of remaining said plurality of shifters performing a necessary shift operation by selecting bit positions of a preceding one of said plurality of shifters in a series arrangement from which data is received in accordance with a respective shift control signal corresponding to said one of a plurality of shift amounts;
said top shifter operating in one of a first, second and third mode in accordance with said respective shift control signal for said top shifter, said top shifter outputting first output data of 24 bits such that, in the first mode, the least significant 8 bits of said first input data is output as the most significant 8 bits of said first output data and said 16 bits of said second input data is output as the least significant 16 bits of said first output data, in the second mode, the 16 bits of said first input data is output as the most significant 16 bits of said first output data and the most significant 8 bits of said second input data is output as the least significant 8 bits of said first output data, and in the third mode, the least significant 8 bits of said first input data is output as the intermediate 8 bits located between the most significant 8 bits and the least significant 8 bits of said first output data and the least significant 8 bits of said second input data is output as the least significant 8 bits of said first output data, wherein said plurality of shifters further comprise:
a first shifter directly connected to said top shifter and configured to provide a first shift amount greater than or equal to 0 bits and less than or equal to 4 bits to said first output data, said first shifter outputting second output data as a result thereof, wherein an amount of said first shift amount provided by said first shifter is based on said respective shift control signal received by said first shifter;
a second shifter directly connected to said first shifter and configured to provide a second shift amount greater than or equal to 0 bits and less than or equal to 2 bits to said second output data, said second shifter outputting third output data as a result thereof, wherein an amount of said second shift amount provided by said second shifter is based on said respective shift control signal received by said second shifter;
a third shifter directly connected to said second shifter and configured to provide a third shift amount greater than or equal to 0 bits and less than or equal to 1 bit to said third output data, said third shifter outputting fourth output data as a result thereof, wherein an amount of said third shift amount provided by said third shifter is based on said respective shift control signal received by said third shifter; and
a fourth shifter directly connected to said third shifter and configured to provide a fourth shift amount greater than or equal to 0 bits and less than or equal to 1 bit to said fourth output data, said fourth shifter outputting fifth output data as a result thereof, wherein an amount of said fourth shift amount provided by said fourth shifter is based on said respective shift control signal received by said fourth shifter;

wherein each of said respective shift control signals for said top shifter and said first through fourth shifters includes a right shift control signal and a left shift control signal, each of which can be ON of OFF, and wherein said first shifter operates in one of a first, second and third mode in accordance with said respective shift control signal for said first shifter, said first shifter outputting said second output data of 20 bits such that, in the first mode, the least significant 16 bits of said first output data received from said top shifter is output as the least significant 16 bits of said second output data, in the second mode, the most significant 20 bits of said first output data received from said top shifter is output as the 20 bits of said second output data in said second mode, and in the third mode, the least significant 4 bits of said first output data received from said top shifter is output as the least significant 4 bits of said second output data and the third least significant group of 4 bits of said first output data received from said top shifter is output as the second least significant group of 4 bits of said second output data.

* * * * *